United States Patent
Maier

[11] 3,718,055
[45] Feb. 27, 1973

[54] ROTARY INDEXING MACHINE
[75] Inventor: Heinz Maier, 7101 Sulzbach, Germany
[73] Assignee: Fischer-Brodbeck G.m.b.H. Prazisionsteile-Fabrik, Weinsberg, Germany
[22] Filed: Dec. 8, 1970
[21] Appl. No.: 96,065

[30] Foreign Application Priority Data
Dec. 11, 1969 Germany..................P 19 62 097.4

[52] U.S. Cl.....................74/826, 74/813 L, 74/820
[51] Int. Cl. .............................................B23b 29/32
[58] Field of Search ....74/827, 826, 824, 820, 813 L, 74/813 R

[56] References Cited
UNITED STATES PATENTS 3,618,426  11/1971  Fisher......................................74/824
2,975,657  3/1961  Samuel................................74/826 X

*Primary Examiner*—Benjamin W. Wyche
*Assistant Examiner*—F. D. Shoemaker
*Attorney*—Michael S. Striker

[57] ABSTRACT

A rotary indexing machine in which for alternately turning the turntable one step in its peripheral direction and locking it between the steps the turntable is only rotatably mounted and immovable in its axial direction . This is effected by means of three crown gears, the first of which is secured to the turntable and surrounds a second stationary crown gear of the same pitch, while a third crown gear is alternately movable in opposite axial directions for simultaneously engaging it with the first and second gears so as to lock them to each other and thus to lock the turntable during its stopping periods and for disengaging it from the first and second gears during the turning movements of the turntable.

11 Claims, 6 Drawing Figures

PATENTED FEB 27 1973    3,718,055

INVENTOR.
HEINZ HALER
BY
Attorney

ROTARY INDEXING MACHINE

The present invention relates to a rotary indexing machine which is provided with an indexing or turntable which by means of crown gears is adapted to be alternately locked to a stationary part of the machine or to be released from this stationary part and then to be turned one step of a predetermined length in its peripheral direction.

The known indexing machines of this type which operate with crown gears are all designed so that the turntable itself has to be lifted and lowered. When it is lifted, the turntable is connected by one crown gear to another crown gear on an indexing element so as to be turned by the latter for one step of a certain distance in its peripheral direction, and when it is lowered, the turntable is locked by a further crown gear to a stationary crown gear.

It is the principal object of the present invention to provide a rotary indexing machine of a more simple construction than that of the known machines of this type, and it is a further object of the invention to design this machine so as no longer to require any axial reciprocating movements, that is, usually any lifting and lowering movements, of the turntable.

For attaining these objects, the present invention provides the machine with two separate crown gears which have the same pitch and are disposed coaxially to each other and also to the turntable so that one of these gears forms a ring which surrounds the other gear and when both gears are in corresponding positions, the corresponding teeth of both gears will be in radial alignment with each other. One of these gears is rigidly secured to the turntable, while the other gear is secured in a fixed position, for example, to the machine frame. The invention further provides a third crown gear which is likewise coaxial with the first and second gears and with the turntable and is movable in its axial direction for alternately engaging it with both first and second gears or for disengaging it from these two gears. When the third gear is moved so as to engage with the first and second gears, the turntable will be locked in a fixed position, while when the third gear is disengaged from the two other gears, the turntable may be turned by an indexing mechanism for a predetermined distance in its peripheral direction.

By designing the new rotary indexing machine so that the axially movable third crown gear is adapted to engage simultaneously with or disengage from the two other gears, it eliminates the need of a fourth gear which was required in the known machines of this type as well as the need of lifting and lowering the turntable. Furthermore, since the first and second crown gears are disposed coaxially within each other and have the same pitch so that their corresponding teeth extend within the same radial planes, both of these gears while clamped together may be produced by the same milling operation and therefore at a very low cost. Such a common production of these two gears by the same operation has the further advantage of insuring that the pitch of both of these gears will be identical.

Of course, if desired, it is also possible to provide one of the first two gears with a pitch and number of teeth which may be an integral multiple or an integral fraction of the pitch and number of teeth of the other gear, provided the axially movable third gear has the same pitch and number of teeth as the first or second gear which has the larger pitch and larger number of teeth.

In order to compensate for inaccuracies of manufacture or assembly and to facilitate the proper engagement of the axially movable crown gear with the two other crown gears one of which is disposed within the other, it is another feature of the invention to design or to mount one of these two last-mentioned gears so as to be resilient in its axial direction. If desired, the resilience of this gear may be further increased by the provision of additional means. Due to this resilience, this gear will adjust itself more easily relative to the other gear when the third gear is moved axially into engagement with these two gears.

For effecting the axial reciprocating movements of this third gear, it is advisable to provide suitable mechanical, pneumatic or hydraulic means which are preferably operated automatically. These means preferably lift the third gear against spring action so as to disengage it from the two other gears so that the turntable will then be unlocked and may be turned one step by the indexing mechanism.

These and additional features and advantages of the present invention will become further apparent from the following detailed description thereof which is to be read with reference to the accompanying drawings, in which;

FIG. 5 shows an enlarged cross section which is taken along the line 5 — 5 of FIG. 3; while

Figure 1:
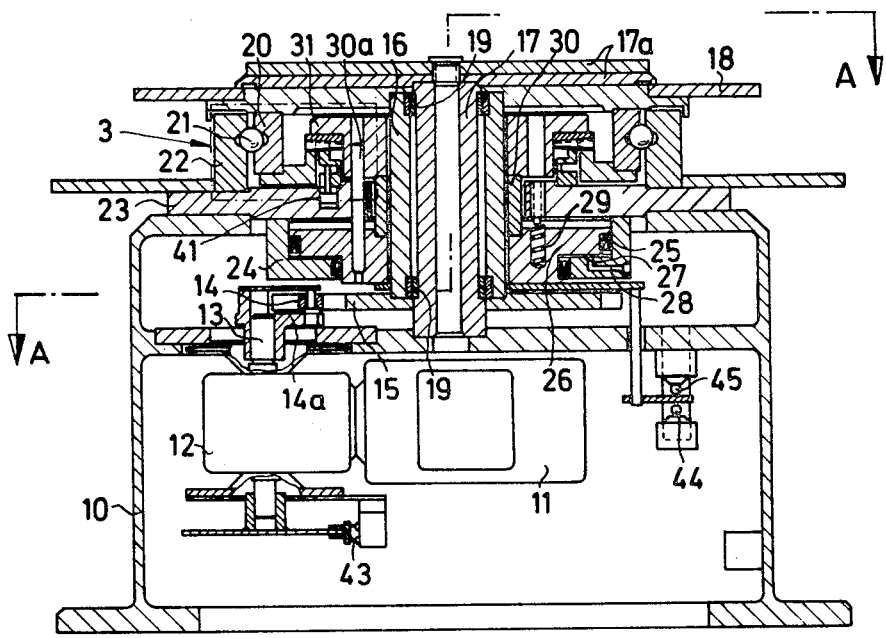
FIG. 1 shows an axial section of a machine according to the invention, in which the turntable is rotatable about a vertical axis.
Figure 2:
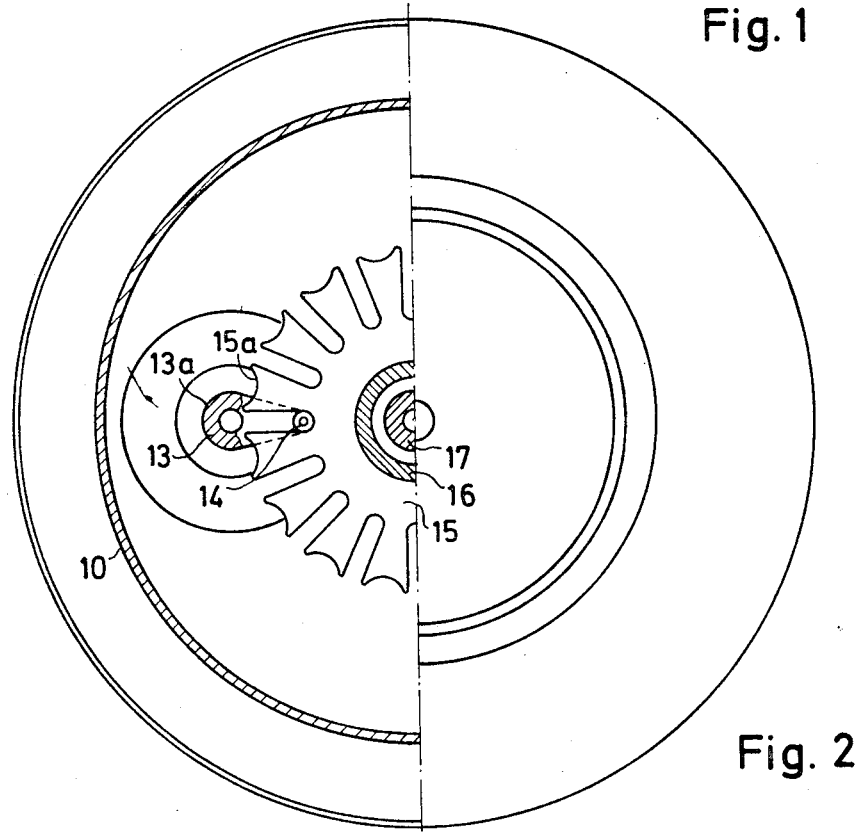
FIG. 2 shows a partially sectioned view which is taken along the line A — A of FIG. 1.

As illustrated particularly in FIGS. 1 and 2, the rotary indexing machine according to the invention comprises a frame or housing 10 in which a driving motor 11 is mounted which is connected to a reduction gear 12 which by means of a shaft 13 drives a coupling member 14, for example, in the form of a roller, which is mounted on the end of an arm 14a which secured to the shaft 13. This coupling member is adapted to drive a star wheel 15 or the like so that at each revolution of the coupling member 14 about the axis of shaft 13 the star wheel 15 will be moved one step in its peripheral direction. This star wheel 15 is rigidly secured to a tubular shaft 16 which is rotatably mounted in bearings 19 and extends coaxially to an upright 17 which is rigidly secured to the machine frame 10 and supports a pair of stationary table plates 17a. Underneath these table plates 17a a turntable 18 of a larger outer diameter is rotatable by having a bearing ring 20 rigidly secured thereto which is rotatably mounted by means of balls 21 on an outer bearing ring 22 which is rigidly secured by an intermediate plate 23 to the machine frame 10.

Together with a ring 24 of an angular cross section the intermediate plate 23 forms a cylinder 25 in which an annular piston 26 is movable upwardly and downwardly. At the lower side of piston 26 a cylinder chamber 27 is provided to which a hydraulic or pneumatic pressure medium may be supplied through a line 28 so as to lift the piston against the action of several springs 29 which are disposed at equal peripheral distances from each other.

Piston 26 is connected in the axial direction to a locking member 31 by means of a sleeve 30 which surrounds the tubular shaft 16. Locking member 31 as well as the piston 26 are prevented from turning relative to the machine frame 10 by one or more rods 30a which extend through bores in the intermediate plate 23.

The locking mechanism according to the invention for connecting the annular turntable 18 to the machine frame by interengaging gear teeth is illustrated in detail in FIGS. 3 to 6. The bearing ring 20 of the turntable 18 is for this purpose rigidly secured by screws 32 to a ring 33 which is provided with a set of crown gear teeth 34. The stationary intermediate plate 23 further carries a ring 35 which is provided with a set of crown gear teeth 36 which is disposed coaxially to the set of teeth 34 and within a common transverse plane extending vertically to the axis of the turntable. When the teeth 34 and 36 are disposed in corresponding positions, they are in radial alignment with each other.

These gear teeth 34 and 36 are adapted to engage with a set of gear teeth 37 on a ring 38 which is rigidly connected by screws 39 to the locking member 31 and thus to the piston 26.

Ring 35 is provided underneath the gear teeth 36 with a recess 40 which extends radially inwards from its outer peripheral surface and gives the teeth 36 a certain resilience in the axial direction so as to insure a proper engagement of the teeth 36 with the teeth 37. The axial pressure which is exerted by the teeth 37 upon the teeth 36 when they are moved into engagement with the latter may be opposed by an additional force $P_3$ which is produced by a piston 41 and is transmitted by a piston rod 42 to the set of teeth 36. Piston 41 with piston rod 42 therefore serve as additional shock absorbers in cooperation with the radial recess 40. The force $P_3$ which is exerted by piston 41 may be greater than the spring force of the resilience of the teeth 36 which is due to the recess 40, but it should preferably not be greater than one half of the force $P_1$. Due to this support by the piston 41, it is possible to increase the tangential load upon the turntable 18 which would otherwise be limited by the resilience of the teeth 36.

The numerals 43, 44 and 45 in FIG. 1 designate limit switches which may be of a type known as such.

Figure 3:
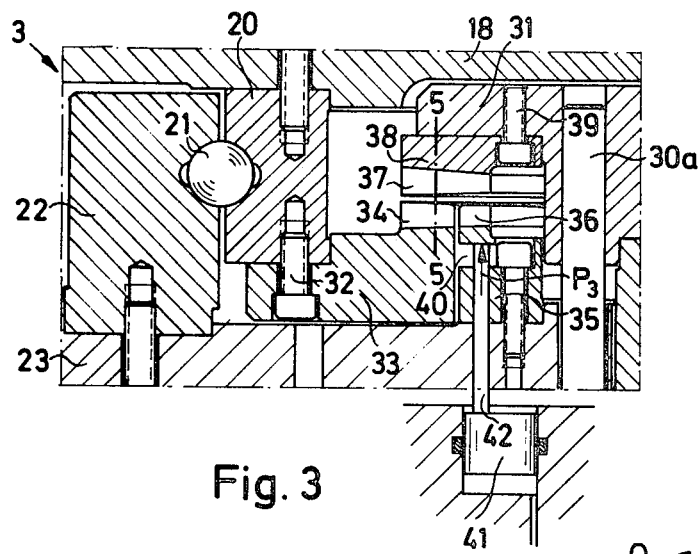
FIG. 3 shows an enlarged view of the part of the machine which is defined by the rectangle 3 as indicated in dot-and-dash lines in FIG. 1, and in a position in which the turntable is disengaged from the machine frame.
Figure 5:
Figure 6:
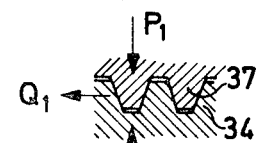
FIG. 6 shows an enlarged cross section which is taken along the line 6 — 6 of FIG. 4.
Figure 4:
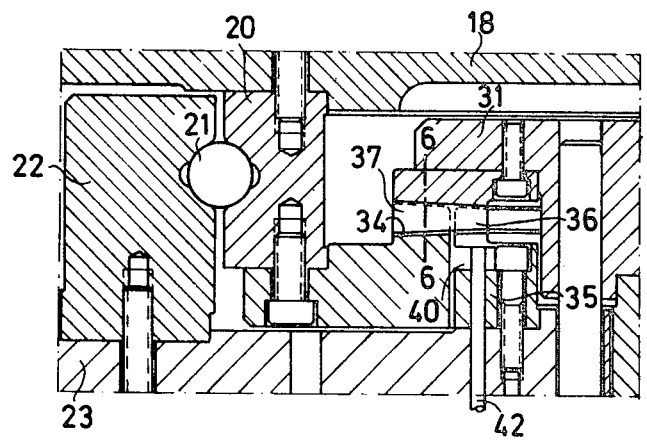
FIG. 4 shows the same part of the machine as shown in FIG. 3, but in a position in which the turntable is locked to the machine frame.

In FIGS. 3 and 5, the cylinder chamber 27 as shown in FIG. 1 is under pressure and piston 26 together with the clutch ring 31 is lifted so that the gear teeth 37 are disengaged from the gear teeth 34 and 36. The turntable 18 may therefore be turned by the motor 11 and the coupling roller 14 on arm 14a so that the star wheel 15 will then be turned by one step. As soon as the arm 14a carrying the coupling roller 14 has completed one revolution, motor 11 is stopped or the reduction gear 12 is disengaged by a limit switch 43. As soon as this coupling roller 14 is disengaged from the star wheel 15, the latter is locked because the arcuate part 13a of arm 14a then engages into the next arcuate recess 15a of the star wheel. At the same time, the pressure medium is discharged from the cylinder chamber 27 so that the spring or springs 29 will press the piston 26 to its lower position and the ring 38 will be lowered and its teeth 37 will engage with the gear teeth 34 and 36, as illustrated in FIGS. 4 and 6. In order to facilitate the proper engagement of the gear teeth, these teeth are made of a trapezoidal cross section. If at the time of the engagement of the teeth the position of the teeth 37 does not accurately correspond to the position of the tooth gaps of the teeth 34 and 36, the oppositely directed engaging forces $P_1$ and $P_2$ and the resulting wedging effect occurring between the upper and lower teeth will produce a tangential transverse force $Q_1$ which will shift the teeth to the proper position relative to each other. When piston 26 reaches the end of its downward stroke, turntable 18 will be rigidly connected to the machine frame 10 and the respective work may then be carried out on the turntable. This work may be started by a limit switch 44 which is actuated when the turntable is in this locked position.

After the particular work has been completed, the pressure medium is again supplied to the cylinder chamber 27 so that piston 26 will be lifted and the gear teeth 37 will be disengaged from the gear teeth 3 and 36. When piston 26 reaches the end of its upward stroke, the machine will again be in the position as illustrated in FIGS. 3 and 5. In this position, the limit switch 45 will also be actuated which causes the motor 11 to be switched on so that the star wheel 15 and thus also the turntable 18 will be turned one further step.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A rotary indexing machine having a frame; a turntable rotatably mounted on said frame; indexing means for alternately turning said turntable one step of a predetermined length in its peripheral direction and for stopping said turntable for a predetermined period between adjacent turning steps; a first crown gear secured to said turntable; a second crown gear separate from and coaxial to said first gear and secured substantially stationary to said frame, one of said two gears surrounding the other gear; a third crown gear coaxial to said first and second gears and non-rotatable relative to said frame but movable in its axial direction relative to said first and second gears; and means for alternately moving said third gear substantially simultaneously into engagement with said first and second gears during said stopping period of said turntable so as to lock said first gear to said non-rotatable second gear and for moving said third gear out of engagement with said first and second gears so as to release the first gear from said second gear so as to permit said indexing means to turn said turntable one step.

2. A rotary indexing machine having a frame; a turntable rotatably mounted on said frame; indexing means for alternately turning said turntable one step of a predetermined length in its peripheral direction and for stopping said turntable for a predetermined period between adjacent turning steps; a first crown gear secured to said turntable; a second crown gear separated from and coaxial to said first gear and secured substantially stationary to said frame, one of said two gears surrounding the other gear and one of said first and second gears being resilient in its axial direction; a third crown gear coaxial to said first and second gears and movable in its axial direction relative to said first and second gears; and means for alternately moving said third gear substantially simultaneously into engagement with said first and second gears during said stopping period of said turntable so as to lock said first gear to said non-rotatable second gear, and for moving said third gear out of engagement with said first and second gears so as to release said first gear from said second gear so as to permit said indexing means to turn said turntable one step.

3. A rotary indexing machine as defined in claim 2, in which one of said first and second gears comprises a hub and a set of crown teeth projecting from said hub, said hub having an annular recess extending inwardly from its outer peripheral surface and spaced from the base of said teeth so as to render said teeth resilient in the axial direction of said gear.

4. A rotary indexing machine as defined in claim 2, further comprising fluid-controlled cylinder and piston means connecting said second gear to said frame so as to be nonrotatable but resilient in its axial direction during its engagement with said third gear.

5. A rotary indexing machine as defined in claim 3, further comprising auxiliary resilient means connected to the part of said hub forming the base of said teeth and acting upon said hub part in the axial direction of said resilient gear.

6. A rotary indexing machine as defined in claim 5, in which said auxiliary resilient means comprise fluid-controlled cylinder and piston means.

7. A rotary indexing machine having a frame; a turntable rotatably mounted on said frame; indexing means for alternately turning said turntable one step of a predetermined length in its peripheral direction and for stopping said turntable for a predetermined period between adjacent turning steps; a first crown gear secured to said turntable; a second crown gear separate from and coaxial to said first gear and secured substantially stationary to said frame, one of said two gears surrounding the other gear; a third crown gear coaxial to said first and second gears and movable in its axial direction relative to said first and second gears; means for alternately moving said third gear substantially simultaneously into engagement with said first and second gears during said stopping period of said turntable so as to lock said first gear to said non-rotatable second gear, and for moving said third gear out of engagement with said first and second gears so as to release said first gear from said second gear so as to permit said indexing means to turn said turntable one step; a vertical upright rigidly secured to said frame; bearing means supporting said turntable so as to be rotatable about the upper end of said upright and coaxially thereto; driving means for said indexing means; and a tubular shaft surrounding and coaxial to said upright and connecting said driving means to said indexing means, said first and second gears being coaxially to and annularly surrounding said shaft and having upwardly projecting teeth, said third gear being supported by said shaft above said first and second gears and having downwardly projecting teeth adapted to engage with and disengage from the teeth of said first and second gears.

8. A rotary indexing machine as defined in claim 7, in which said substantially stationary second gear is disposed radially inward of said first gear which is rigidly secured to said turntable.

9. A rotary indexing machine having a frame; a turntable rotatably mounted on said frame; indexing means for alternately turning said turntable one step of a predetermined length in its peripheral direction and for stopping said turntable for a predetermined period between adjacent turning steps; a first crown gear secured to said turntable; a second crown gear separate from and coaxial to said first gear and secured substantially stationary to said frame, one of said two gears surrounding the other gear; a third crown gear coaxial to said first and second gears and movable in its axial direction relative to said first and second gears; and means for alternately moving said third gear substantially simultaneously into engagement with said first and second gears during said stopping period of said turntable so as to lock said first gear to said non-rotatable second gear, and for moving said third gear out of engagement with said first and second gears so as to release said first gear from said second gear to thus permit said indexing means to turn said turntable one step, said means for moving said third gear in its axial direction comprising cylinder and piston means, and means for supplying a fluid pressure medium to said cylinder and piston means.

10. A rotary indexing machine as defined in claim 9, in which said means for moving said third gear further comprise spring means, said cylinder and piston means being adapted to move in one direction under the action of said pressure medium and against the action of said spring means so as to disengage said third gear from said first and second gears, said spring means being adapted to move said cylinder and piston means in the opposite direction and to engage said third gear with said first and second gears when said pressure medium is released from said cylinder and piston means.

11. A rotary indexing machine as defined in claim 10, in which said frame comprises a stationary horizontal annular plate underneath said turntable, said gears being disposed between said plate and said turntable, said cylinder and piston means being disposed underneath said plate and comprising a cylinder and an annular piston, and connecting means extending through said plate and substantially rigidly connecting said piston to said third gear.

* * * * *